United States Patent
Nishimura

(10) Patent No.: US 10,409,267 B2
(45) Date of Patent: Sep. 10, 2019

(54) MACHINE TOOL

(71) Applicant: Okuma Corporation, Niwa-Gun (JP)

(72) Inventor: Kohei Nishimura, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 190 days.

(21) Appl. No.: 15/299,814

(22) Filed: Oct. 21, 2016

(65) Prior Publication Data

US 2017/0131704 A1 May 11, 2017

(30) Foreign Application Priority Data

Nov. 9, 2015 (JP) .................................. 2015-219763

(51) Int. Cl.
*G05B 19/416* (2006.01)
*G05B 19/402* (2006.01)
*G05B 19/18* (2006.01)
*B23G 1/04* (2006.01)

(52) U.S. Cl.
CPC ......... *G05B 19/416* (2013.01); *G05B 19/186* (2013.01); *G05B 19/402* (2013.01); *B23G 1/04* (2013.01); *G05B 2219/43132* (2013.01); *G05B 2219/43145* (2013.01)

(58) Field of Classification Search
CPC ............................. G05B 19/416; G05B 19/402
See application file for complete search history.

(56) References Cited

U.S. PATENT DOCUMENTS 4,408,280 A * 10/1983 Bedini ............... G05B 19/4163
                                                                              318/571
9,122,268 B2   9/2015 Nishimura et al.
9,188,972 B2  11/2015 Kido
(Continued)

FOREIGN PATENT DOCUMENTS

CN       102650866 A   8/2012
CN       103785905 A   5/2014
(Continued)

OTHER PUBLICATIONS

Office Action (and English translation obtained from the Global Dossier) from a corresponding Chinese patent application (CN 201610982607.3) dated Dec. 27, 2018, 12 pages.
(Continued)

*Primary Examiner* — Kenneth M Lo
*Assistant Examiner* — David J Wynne
(74) *Attorney, Agent, or Firm* — Burr & Brown, PLLC

(57) ABSTRACT

A main spindle controller of a machine tool varies a rotation speed of a main spindle that grips a workpiece to a varied maximum speed higher than a reference rotation speed set value as a set value of a reference rotation speed by a variation width set value as a set value of a variation width or a varied minimum speed lower than the reference rotation speed set value by the variation width set value in units of the tool path. At the same time, the main spindle controller refers to speed condition information that indicates a condition of the preliminarily stored reference rotation speed and variation width assuming that a chatter vibration is to be reduced, and when at least one of the reference rotation speed set value and the variation width set value does not satisfy the condition of the speed condition information.

9 Claims, 4 Drawing Sheets

(56) References Cited

U.S. PATENT DOCUMENTS

| | | | |
|---|---|---|---|
| 9,690,283 B2 | 6/2017 | Nishimura et al. | |
| 2010/0066291 A1* | 3/2010 | Chang | H02P 23/04 318/460 |
| 2012/0097411 A1* | 4/2012 | Yoshino | B23Q 17/10 173/176 |
| 2012/0221139 A1 | 8/2012 | Kido | |
| 2013/0073251 A1 | 3/2013 | Nishimura et al. | |
| 2014/0121816 A1* | 5/2014 | Nishimura | B23G 3/00 700/159 |
| 2014/0121817 A1 | 5/2014 | Nishimura et al. | |

FOREIGN PATENT DOCUMENTS

| | | |
|---|---|---|
| JP | 2012-086347 | 5/2012 |
| JP | 2012-088968 | 5/2012 |
| JP | 2013-063497 | 4/2013 |
| JP | 2013-244576 | 12/2013 |
| JP | 2014-087887 A1 | 5/2014 |
| JP | 2014-087888 A1 | 5/2014 |

OTHER PUBLICATIONS

Japanese Office Action (and translation obtained from the Global Dossier) from a corresponding Japanese patent application (JP 2015-219763) dated Mar. 15, 2019, 9 pages

* cited by examiner

MACHINE TOOL

BACKGROUND

This application claims the benefit of Japanese Patent Application Number 2015-219763 filed on Nov. 9, 2015 the entirety of which is incorporated by reference.

TECHNICAL FIELD

The disclosure relates to a machine tool such as a lathe configured to perform a threading.

RELATED ART

A machine tool disclosed in Japanese Unexamined Patent Application Publication No. 2014-87888 has been known as a machine tool that reduces a chatter vibration in a threading by a tool movable in a radial direction and an axial direction with respect to a shaft-shaped workpiece. The machine tool repeats a tool path where the tool is caused to cut in the radial direction, move in the axial direction, and move away in the radial direction with respect to the workpiece rotating around an axis line. In the machine tool, the rotation speed of the workpiece is varied to a predetermined high rotation speed (varied maximum speed) or a predetermined low rotation speed (varied minimum speed) in each tool path. The rotation speed in a first tool path is determined such that the tool path of a specified number of times (the last) is performed at a high speed rotation speed.

In the machine tool disclosed in Japanese Unexamined Patent Application Publication No. 2014-87888, a difference between the high speed rotation speed and the low speed rotation speed (variation width) for efficiently reducing the chatter vibration with respect to various workpieces is not necessarily clear. Then, it is relatively difficult for a worker to seek and set the appropriate variation width by the workpieces. It is also not clear how to deal with a case where the chatter vibration fails to be reduced even though the variation width of the rotation speed is set by the tool paths. Further, since the machine tool is configured to command the variation width exceeding an upper limit of the rotation speed of the workpiece (upper limit rotation speed), the rotation speed according to the command (command of a higher speed compared with the upper limit rotation speed) possibly differs from the actual rotation speed (upper limit rotation speed).

Therefore, it is an object of the disclosure to provide a machine tool that ensures easily setting a rotation speed for efficiently reducing a chatter vibration, a variation width of the rotation speed, and similar parameter.

SUMMARY

In order to achieve the above-described object, there is provided a machine tool according to a first aspect of the disclosure. The machine tool includes a gripping unit, a tool, a processing control unit, a rotation speed control unit, and a rotation speed calculation unit. The gripping unit is configured to grip a shaft-shaped workpiece. The tool is movable in a radial direction and an axial direction with respect to the workpiece. The processing control unit is configured to perform a threading by repeating a tool path, and the tool cuts into the workpiece in the radial direction, moves in the axial direction of the workpiece, and moves away from the workpiece the radial direction while the workpiece and the tool are relatively rotated around an axis line of the workpiece. The rotation speed control unit is configured to vary the relative rotation speed of the workpiece and the tool in units of the tool path. The rotation speed calculation unit is configured to calculate the rotation speed of each of the tool paths. The rotation speed control unit varies the rotation speed to a varied maximum speed higher than a reference rotation speed set value by a variation width set value as a set value of a variation width or a varied minimum speed lower than the reference rotation speed set value by the variation width set value, or varies the rotation speed to any one of a plurality of rotation speed candidate values. At the same time, the rotation speed control unit refers to speed condition information that indicates a condition of preliminarily stored reference rotation speed and variation width, or the rotation speed candidate value assuming that a chatter vibration is to be reduced. Then, when at least one of the reference rotation speed set value and the variation width set value, or the rotation speed candidate value does not satisfy the condition, the rotation speed control unit varies at least one of the reference rotation speed set value and the variation width set value, or varies the rotation speed candidate value so as to satisfy the condition, or the rotation speed control unit indicates on a display unit that varying should be made.

According to a second aspect of the disclosure, which is in the first aspect of the disclosure, the speed condition information indicates the condition of the reference rotation speed and the variation width, or the condition of the rotation speed candidate value such that the varied maximum speed does not exceed an upper limit rotation speed as an upper limit value of a predetermined rotation speed.

According to a third aspect of the disclosure, which is in the above-described disclosure, the rotation speed control unit varies the reference rotation speed set value or the rotation speed candidate value such that the varied maximum speed or the rotation speed candidate value corresponds to the upper limit rotation speed, or the rotation speed control unit indicates that varying should be made.

According to a fourth aspect of the disclosure, which is in the above-described disclosure, the speed condition information includes a recommended variation width as a predetermined recommended value of the variation width assuming that the chatter vibration is to be reduced, and the rotation speed control unit varies the variation width set value so as to correspond to the recommended variation width, or indicates that varying should be made.

According to a fifth aspect of the disclosure, which is in the above-described disclosure, the speed condition information indicates the condition of the reference rotation speed and the variation width, or the condition of the rotation speed candidate value such that the varied minimum speed or the rotation speed candidate value is equal to or more than a lower limit rotation speed as a lower limit value of a predetermined rotation speed.

According to a sixth aspect of the disclosure, which is in the above-described disclosure, the display unit indicates the relation between the variation width and the reference rotation speed, or the rotation speed candidate value where the varied maximum speed or the rotation speed candidate value is equal to or less than the upper limit rotation speed.

According to a seventh aspect of the disclosure, which is in the above-described disclosure, the display unit indicates the variation width and the reference rotation speed, or the rotation speed candidate value where the condition that the varied maximum speed or the rotation speed candidate value is equal to the upper limit rotation speed is satisfied.

According to an eighth aspect of the disclosure, which is in the above-described disclosure, the machine tool further includes a vibration detector that detects the chatter vibration, and the rotation speed control unit performs at least one of a variation for decreasing the reference rotation speed set value and a variation for approaching the variation width set value to the recommended variation width, or performs a variation of the rotation speed candidate value, or the rotation speed control unit indicates that varying should be made when a vibration detected by the vibration detector is equal to or more than a preliminarily stored threshold.

According to a ninth aspect of the disclosure, which is in the above-described disclosure, the rotation speed control unit varies the variation width and the reference rotation speed in a state where the varied maximum speed is equal to the upper limit rotation speed.

With the machine tool according to the disclosure, the rotation speed for efficiently reducing a chatter vibration, a variation width of the rotation speed, and similar parameter can be easily set.

BRIEF DESCRIPTION OF THE DRAWINGS

FIG. 4A is a view illustrating a case where a reference rotation speed set value $S_0$ is equal to or less than a recommended rotation speed $S_1$ ($S_0 \leq S_1$). FIG. 4B is a view illustrating a case where the reference rotation speed set value $S_0$ exceeds the recommended rotation speed $S_1$, and is less than an upper limit rotation speed $S_{max}$ ($S_1 < S_0 < S_{max}$). FIG. 4C is a view illustrating a case where the reference rotation speed set value $S_0$ is equal to or more than the upper limit rotation speed $S_{max}$ ($S_0 \geq S_{max}$).

DETAILED DESCRIPTION

The following describes examples of an embodiment of the disclosure based on the drawings as necessary. The embodiment of the disclosure is not limited to the following examples.

Figure 1:
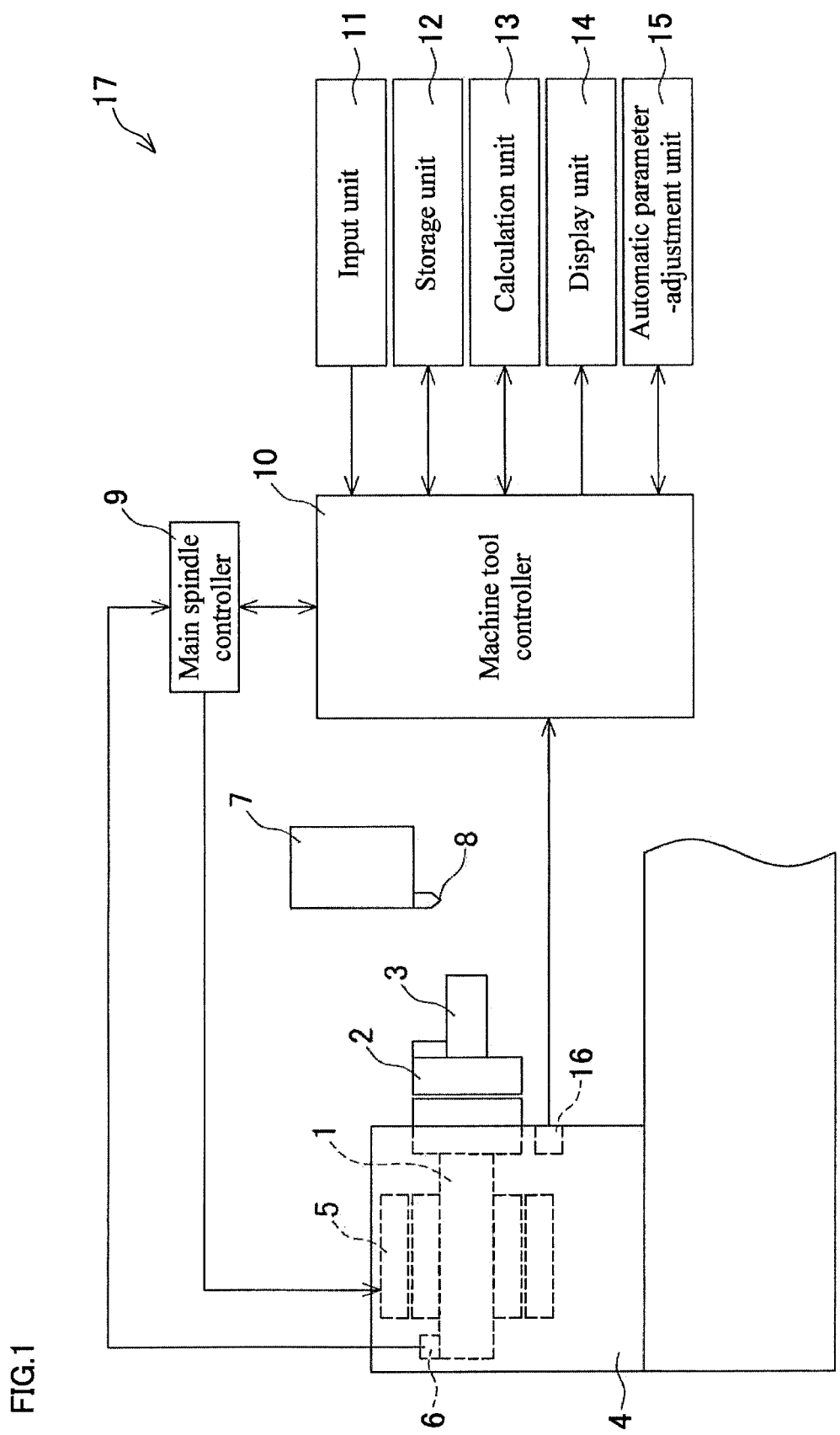
FIG. 1 is a schematic diagram illustrating a machine tool according to the disclosure.

FIG. 1 is a schematic diagram of a machine tool 17 according to the embodiment. The machine tool 17 includes a main spindle 1 that includes a chuck 2 as a gripping unit on a distal end. The chuck 2 is configured to grip a shaft-shaped workpiece 3. The main spindle 1 is rotatably supported by a headstock 4. The headstock 4 includes a motor 5 for rotating the main spindle 1 and an encoder 6 for detecting a rotation speed of the main spindle 1. The encoder 6 is used by a main spindle controller 9 as a rotation speed control unit to monitor the rotation speed of the main spindle 1 and control the rotation speed of the main spindle 1. The machine tool 17 includes a tool post 7 configured to operate in a radial direction and a longitudinal direction of the workpiece 3. A tool 8 is secured to the tool post 7.

The machine tool 17 includes a machine tool controller 10 that controls the behavior of the entire machine tool 17. The machine tool controller 10 is coupled to the main spindle controller 9 as the rotation speed control unit and a feed axis controller (a processing control unit, not illustrated) that controls operations of the tool post 7. To the machine tool controller 10, an input unit 11, a storage unit 12, a calculation unit 13, a display unit 14, an automatic parameter-adjustment unit 15, and a vibration detector 16 are coupled. The machine tool controller 10 determines an existence of a chatter vibration based on information from the vibration detector 16. The machine tool 17 controls the rotation speed of the workpiece 3, which is supported by the main spindle 1, via the machine tool controller 10 (a rotation speed calculation unit). The machine tool 17 also controls processing operations in which the tool 8 cuts in the radial direction of the workpiece 3 to transmit the tool 8 in the longitudinal direction with a well-known configuration (a control unit of the processing control unit). The processing control unit may be configured by the machine tool controller 10 alone, or may be configured by a combination of the machine tool controller 10 and the feed axis controller.

Figure 2:
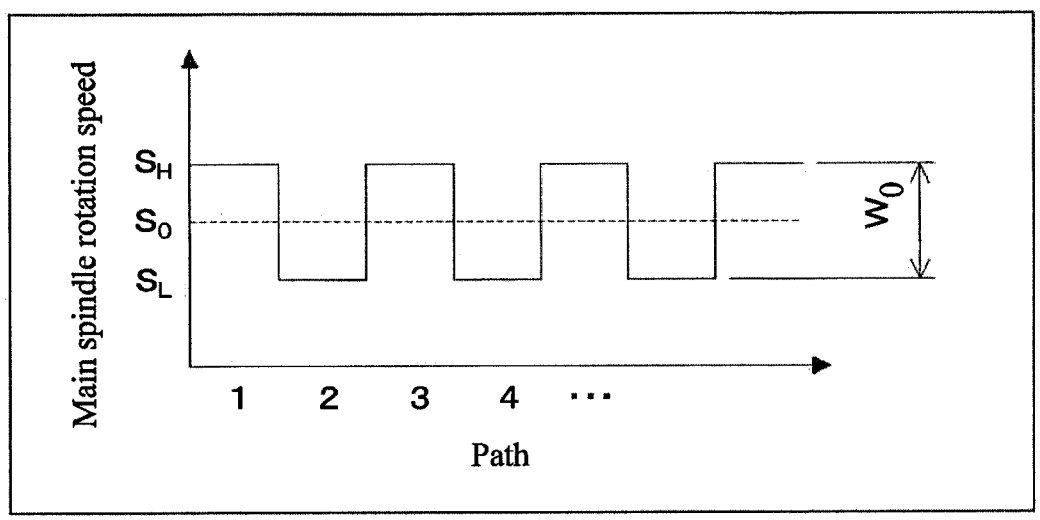
FIG. 2 is an explanatory view illustrating an exemplary relation between a main spindle rotation speed and paths when the main spindle rotation speed is varied in tool path (path) units according to the machine tool in FIG. 1.

FIG. 2 is an explanatory view illustrating an exemplary threading where a main spindle rotation speed as the rotation speed of the main spindle 1 is varied in tool path (path) units. One path is configured such that the tool 8 cuts to the workpiece 3, which is rotated by the main spindle 1 (the chuck 2), in the radial direction and moves in the axial direction of the workpiece 3, then, moves away from the workpiece in the radial direction. In the machine tool 17, such paths are repeated as necessary. In FIG. 2, a first (first counting from a start of a processing) path is indicated as 1, the next path is indicated as 2, and the following paths are indicated similarly. The calculation unit 13 refers to a [Expression 1] below stored in the storage unit 12 based on parameters such as a reference rotation speed set value $S_0$ as a current set value of a reference rotation speed S of the main spindle rotation speed and a variation width set value $W_0$ as a current set value of a variation width W (%) that indicates a variation degree from the reference rotation speed set value $S_0$. Then, the calculation unit 13 calculates a varied maximum speed $S_H$ as a maximum value of the main spindle rotation speed and a varied minimum speed $S_L$ as a minimum value of the main spindle rotation speed in the case where the main spindle rotation speed is varied. Then, the machine tool controller 10 transmits a command to the main spindle controller 9 to vary the main spindle rotation speed to any of the calculated varied maximum speed $S_H$ and varied minimum speed $S_L$ in the path unit.

$$S_H = \left(1 + \frac{W_0}{200}\right)S_0 \qquad \text{[Expression 1]}$$

$$S_L = \left(1 - \frac{W_0}{200}\right)S_0$$

Figure 3:
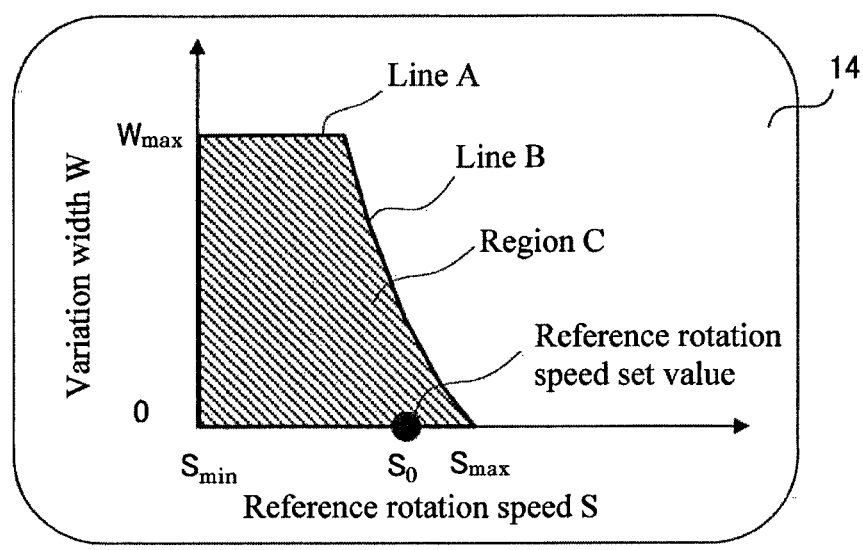
FIG. 3 is an explanatory view illustrating an exemplary display of a relation between a variation width where a varied maximum speed does not exceed an upper limit rotation speed and a reference rotation speed according to the machine tool in FIG. 1.

Next, a description will be given of an exemplary display of a relation between the variation width W and the reference rotation speed S where the varied maximum speed $S_H$ does not exceed the upper limit of the main spindle rotation speed (the upper limit rotation speed $S_{max}$), and an exemplary display for guiding the variation width W and the reference rotation speed S where the chatter vibration is more easily reduced, as a main part of the disclosure. FIG. 3 is an explanatory diagram illustrating the former exemplary display. In the example illustrated in FIG. 3, the parameters are the variation width W and the reference rotation speed S, and the machine tool controller 10 receives a calculation result from the calculation unit 13 to control the display unit 14 to indicate that the reference rotation speed set value $S_0$ is plotted on a plane with the variation width W as a vertical axis and the reference rotation speed S as a horizontal axis. Here, a variation width upper limit value $W_{max}$ as an upper limit value of the variation width W is a predetermined value stored in the storage unit 12. A lower limit rotation speed $S_{min}$ is a predetermined value (which is empirically determined as a value in which the chatter vibration does not occur) that indicates a lower limit of the main spindle rotation speed in the threading, and stored in the storage unit 12. The upper limit rotation speed $S_{max}$ is a value indicating an upper limit of the main spindle rotation speed, and stored in the storage unit 12. Here, the horizontal axis is configured to start from a lower limit rotation speed $S_{min}$ and include the upper limit rotation speed $S_{max}$ near the center. The calculation unit 13 uses following [Expression 2] and [Expression 3] to calculate and draw a line A and a line B respectively. Further, a region C surrounded by the lines A and B, the vertical axis, and the horizontal axis (indicated by shaded (hatching) in FIGS. 3 and 4) indicates the relation between the variation width W and the reference rotation speed S where the varied maximum speed $S_H$ does not exceed the upper limit rotation speed $S_{max}$, and satisfies following [Expression 4] and [Expression 5].

$$W = W_{max} \quad \text{[Expression 2]}$$

$$S_H = S_{max} \quad \text{[Expression 3]}$$

$$W \leq W_{max} \quad \text{[Expression 4]}$$

$$S_H \leq S_{max} \quad \text{[Expression 5]}$$

Figure 4A:
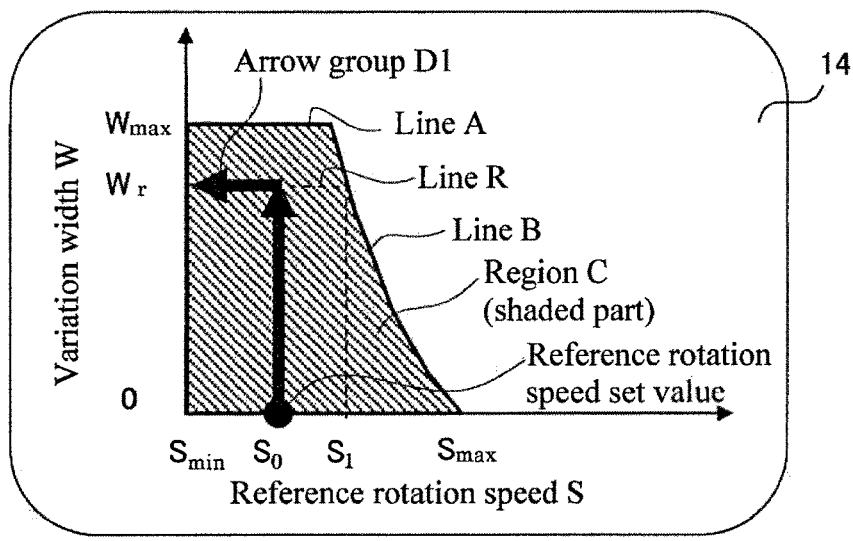
FIGS. 4A to 4C are explanatory views illustrating exemplary displays for guiding variation width set values and reference rotation speed set values that more easily reduce a chatter vibration according to the machine tool in FIG. 1.
Figure 4B:
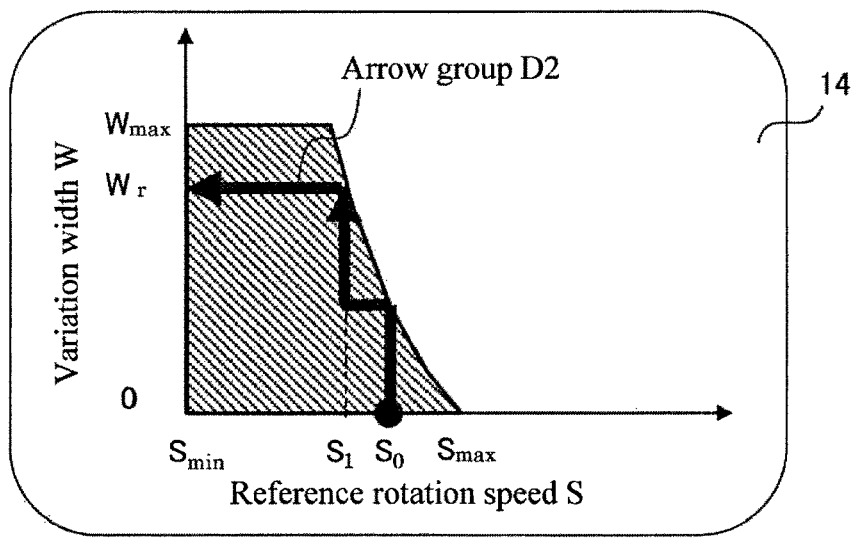
Figure 4C:
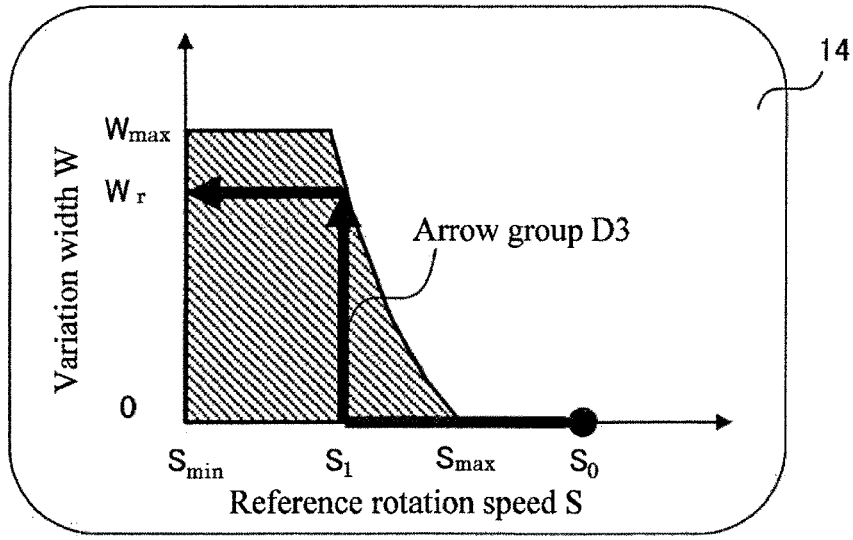

FIGS. 4A to 4C are explanatory drawings illustrating exemplary displays for guiding the variation width W and the reference rotation speed S where the chatter vibration is more easily reduced. In FIGS. 4A to 4C, a recommended variation width $W_r$ is a recommended variation width W preliminarily set based on such as experiences, and a following [Expression 6] is used to indicate a line R. A recommended rotation speed $S_1$ is a rotation speed indicated as an intersection point of the line R and the line B. FIGS. 4A, 4B, and 4C are respectively exemplary displays when following [Expression 7], [Expression 8], and [Expression 9], which indicate relationship between the reference rotation speed set value $S_0$ and the recommended rotation speed $S_1$ or the upper limit rotation speed $S_{max}$, are satisfied.

$$W = W_r \quad \text{[Expression 6]}$$

$$S_0 \leq S_1 \quad \text{[Expression 7]}$$

$$S_1 \leq S_0 \leq S_{max} \quad \text{[Expression 8]}$$

$$S_{max} \leq S_0 \quad \text{[Expression 9]}$$

The machine tool controller 10 determines which relation among [Expression 7] to [Expression 9] are satisfied, and controls the display unit 14 to indicate a guide to increase the variation width set value $W_0$ toward the recommended variation width $W_r$ in a range of the region C as illustrated in FIGS. 4A to 4C corresponding to each case. As illustrated in FIG. 4A, when the relation of [Expression 7] is satisfied and the variation width set value $W_0$ can be maintained to a value identical to the recommended variation width $W_r$ (a condition that a point ($S_0$, $W_r$) exists in the region C is satisfied), an arrow group D1 is used to indicate a guide to maintain the parameters to the current point ($S_0$, $W_r$). The arrow group D1 is constituted of a pair of an arrow extending from a point ($S_0$, 0) to a point ($S_0$, $W_r$) in a direction parallel to the vertical axis and an arrow extending from a point ($S_0$, $W_r$) to a point (0, $W_r$)

On the other hand, as illustrated in FIG. 4B, when the relation of [Expression 8] is satisfied and the variation width set value $W_0$ reaches the line B before the variation width set value $W_0$ is increased to the recommended variation width $W_r$, an arrow group D2 is used to indicate a guide to decrease the reference rotation speed set value $S_0$ to the recommended rotation speed $S_1$ and increasing the variation width set value $W_0$ toward the recommended variation width $W_r$ (a guide to satisfy a condition that $S_0$ is equal to $S_1$ and satisfying a condition that $W_0$ is equal to $W_r$). The machine tool controller 10 calculates the value of the reference rotation speed set value $S_0$ to be decreased as the recommended rotation speed $S_1$ with the highest processing efficiency within a range where the variation width set value $W_0$ can be set to the recommended variation width $W_r$.

Further, as illustrated in FIG. 4C, when the relation of [Expression 9] is satisfied and the reference rotation speed set value $S_0$ is out of the range of the region C, the display unit 14 uses an arrow group D3 to indicate a guide to firstly decrease the reference rotation speed set value $S_0$ to within the range of the region C to be the recommended rotation speed $S_1$ (a guide to satisfy a condition that $S_0$ is equal to $S_1$).

The display unit 14 also indicates a guide to decrease the reference rotation speed set value $S_0$ after increasing the variation width set value $W_0$ toward the recommended variation width $W_r$ for a case where the chatter vibration fails to be reduced. That is, in the case where the machine tool controller 10 recognizes the occurrence of the chatter vibration based on the information from the vibration detector 16 (when the vibration detected by the vibration detector 16 is equal to or more than a threshold that is predetermined and stored), the machine tool controller 10 uses a drawing of an upward arrow to indicate a guide that causes the variation width W to be equal to the recommended variation width $W_r$ when the variation width W is not equal to the recommended variation width $W_r$. Even if the variation width W is equal to the recommended variation width $W_r$, for example, the machine tool controller 10 draws a leftward arrow from the current reference rotation speed set value $S_0$ on the display unit 14 to indicate a guide to further decrease the reference rotation speed set value $S_0$. In the case where the variation width W is equal to the recommended variation width $W_r$, or the reference rotation speed set value $S_0$ is decreased, the machine tool controller 10 can stop the decrease of the reference rotation speed set value $S_0$ when the vibration detected by the vibration detector 16 is reduced to less than the predetermined threshold.

The storage unit 12 stores the information of the relation between the upper limit rotation speed $S_{max}$ and the variation width W illustrated in FIG. 3 and the information of the change of the parameters illustrated in FIGS. 4A to 4C as speed condition information. An operator can change the variation width set value $W_0$ and the reference rotation speed set value $S_0$ via the input unit 11 based on the content indicated on the display unit 14.

The above-described machine tool 17 includes the chuck 2, the tool 8, the feed axis controller, the main spindle controller 9, and the machine tool controller 10. The chuck 2 is disposed on the main spindle 1 to grip the shaft-shaped workpiece 3. The tool 8 is movable in the radial direction and the axial direction with respect to the workpiece 3. The feed axis controller performs the threading by repeating the tool path, and the tool path is configured such that while the workpiece 3 and the tool 8 are relatively rotated around the axis line of the workpiece 3, the tool 8 cuts to the workpiece 3 in the radial direction, moves in the axial direction of the workpiece 3, and moves away from the workpiece in the radial direction. The main spindle controller 9 is configured to vary the main spindle rotation speed corresponding to the relative rotation speed of the workpiece 3 and the tool 8 in units of the tool path. The machine tool controller 10 calculates the main spindle rotation speed of each of the tool paths. The main spindle controller 9 varies the main spindle rotation speed to the varied maximum speed $S_H$ or the varied minimum speed $S_L$. The varied maximum speed $S_H$ is a speed higher than the reference rotation speed set value $S_0$ as the set value of the reference rotation speed S by the variation width set value $W_0$ as the set value of the variation width W, and the varied minimum speed $S_L$ is a speed lower than the reference rotation speed set value $S_0$ by the variation width set value $W_0$. At the same time, the main spindle controller 9 refers to the speed condition information that indicates the condition of the preliminarily stored reference rotation speed S and variation width W assuming that the chatter vibration is to be reduced. Then, when at least one of the reference rotation speed set value $S_0$ and the variation width set value $W_0$ does not satisfy the condition, the main spindle controller 9 indicates on the display unit 14 that at least one of the reference rotation speed set value $S_0$ and the variation width set value $W_0$ should be varied so as to satisfy the condition of the speed condition information. Thus, the machine tool 17 is configured to easily set the rotation speed for efficiently reducing the chatter vibration, the variation width of the rotation speed, and similar parameter.

The speed condition information indicates the condition of the reference rotation speed S and the variation width W such that the varied maximum speed $S_H$ does not exceed the upper limit rotation speed $S_{max}$ as the upper limit value of the predetermined main spindle rotation speed. In the above manner, the chatter vibration is surely reduced. Additionally, the main spindle controller 9 indicates that the reference rotation speed set value $S_0$ should be varied such that the varied maximum speed $S_H$ corresponds to the upper limit rotation speed $S_{max}$. Therefore, processing efficiency is sufficiently secured while the chatter vibration is reduced.

Further, the speed condition information includes the recommended variation width $W_r$ as the predetermined recommended value of the variation width W assuming that the chatter vibration is to be reduced. The main spindle controller 9 indicates that the variation width set value $W_0$ should be varied so as to correspond to the recommended variation width $W_r$. In the above configuration, the chatter vibration is efficiently reduced.

Furthermore, the display unit 14 indicates the relation between the variation width W and the reference rotation speed S where the varied maximum speed $S_H$ is equal to or less than the upper limit rotation speed $S_{max}$ (the region C). Therefore, it is easy to grasp the reference rotation speed set value $S_0$ and the variation width set value $W_0$ to be varied for reducing the chatter vibration. The display unit 14 also indicates the variation width W and the reference rotation speed S (the line B) where the condition that the varied maximum speed $S_H$ and the upper limit rotation speed $S_{max}$ are equal is satisfied. Therefore, it is easy to grasp the reference rotation speed set value $S_0$ and the variation width set value $W_0$ to be varied. As a result, the higher processing efficiency is ensured while the chatter vibration is reduced.

The machine tool according to the disclosure is not limited to the form of the above-described embodiment, and the configuration of the display unit and the overall configuration of the machine tool and the like can be changed as necessary without departing from the spirit of the disclosure. For example, instead that the operator manually varies the parameters based on the information indicated on the display unit, an automatic parameter-adjustment unit (the machine tool controller, the main spindle controller, or may be the combination of them) can automatically change the parameters continuously as described above based on the information stored in the storage unit, and can complete the change of the parameters when the vibration detected by the vibration detector is reduced to less than the predetermined threshold. In the above-described embodiment, the arrow groups of continuous lines are used for indicating the guide to maintain or vary the variation width set value and the reference rotation speed set value. However, a single arrow may be used, other kind of line may be used, an aspect where flashings are transmitted in an order from the base to the distal end of the arrow may be used, and an aspect of the display may be changed depending on the case of maintaining or the case of varying. Additionally, the shade (such as the hatching and the coloring) to the region C may be omitted.

Further, the variation width is the ratio of the rotation speed difference and the reference rotation speed in the above-described embodiment. However, the variation width may be the rotation speed difference, and a main spindle override may be employed instead of the reference rotation speed. Further, in the above-described embodiment, the machine tool is configured to guide so as to firstly increase the variation width set value to reach the line B, decrease the reference rotation speed set value, and increase the variation width set value in the case of FIG. 4B. However, the machine tool may be configured to guide so as to adjust the reference rotation speed set value and the variation width set value along the line B after the variation width set value reaches the line B, or may be configured to guide so as to decrease the reference rotation speed set value before the variation width set value reaches the line B, and increase the variation width set value. In the above-described embodiment, the description was given of the case where the two rotation speeds of the high speed side and the low speed side (the varied maximum speed and the varied minimum speed) are varied by the paths. However, a case of varying many more rotation speeds by paths can be similarly executed by using the difference between the maximum rotation speed (the varied maximum speed) and the minimum rotation speed (the varied minimum speed) to define the variation width. In the above-described embodiment, the machine tool is configured to guide the adjustment of the variation width set value and the reference rotation speed set value such that the varied maximum speed does not exceed the upper limit rotation speed. However, the machine tool may be configured to calculate the variation width set value and the reference rotation speed set value where the varied minimum speed is the lower limit value of the main spindle rotation speed (the lower limit rotation speed) to guide the adjustment of the variation width set value and the reference rotation speed set value such that the actual main spindle rotation speed does not decrease to less than the predetermined lower limit rotation speed. In the above-described embodiment, the variation width and the reference rotation speed are used as the parameters for varying the main spindle rotation speed. However, a plurality of rotation speed candidate values that directly specify the main spindle rotation speed of before and after variation may be used.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool, comprising:
   a gripping unit configured to grip a shaft-shaped workpiece;
   a tool movable in a radial direction and an axial direction with respect to the workpiece;
   a processing control unit configured to perform a threading by repeating a tool path in which the tool cuts into the workpiece in the radial direction, moves in the axial direction of the workpiece, and moves away from the workpiece in the radial direction, while the workpiece and the tool are relatively rotated around an axis line of the workpiece;
   a rotation speed control unit configured to vary the relative rotation speed of the workpiece and the tool in units of the tool path; and
   a rotation speed calculation unit configured to calculate the rotation speed of each of the tool paths, wherein
   the rotation speed control unit does not continuously vary the rotation speed within one path, but varies the rotation speed to a varied maximum speed higher than a reference rotation speed set value by a variation width set value or a varied minimum speed lower than the reference rotation speed set value by the variation width set value, or varies to any one of a plurality of rotation speed candidate values, and
   the rotation speed control unit refers to speed condition information that indicates a condition of preliminarily stored reference rotation speed and variation width, or the rotation speed candidate value assuming that a chatter vibration is to be reduced, and when at least one of the reference rotation speed set value and the variation width set value, or the rotation speed candidate value does not satisfy the condition, the rotation speed control unit varies at least one of the reference rotation speed set value and the variation width set value, or varies the rotation speed candidate value so as to satisfy the condition, or the rotation speed control unit indicates on a display unit that varying should be made.

2. The machine tool according to claim 1, wherein
   the speed condition information indicates the condition of the reference rotation speed and the variation width, or the condition of the rotation speed candidate value such that the varied maximum speed does not exceed an upper limit rotation speed as an upper limit value of a predetermined rotation speed.

3. The machine tool according to claim 2, wherein
   the rotation speed control unit varies the reference rotation speed set value or the rotation speed candidate value such that the varied maximum speed or the rotation speed candidate value corresponds to the upper limit rotation speed, or the rotation speed control unit indicates that varying should be made.

4. The machine tool according to claim 1, wherein
   the speed condition information includes a recommended variation width as a predetermined recommended value of the variation width assuming that the chatter vibration is to be reduced, and
   the rotation speed control unit varies the variation width set value so as to correspond to the recommended variation width, or indicates that varying should be made.

5. The machine tool according to claim 1, wherein
   the speed condition information indicates the condition of the reference rotation speed and the variation width, or the condition of the rotation speed candidate value such that the varied minimum speed or the rotation speed candidate value is equal to or more than a lower limit rotation speed as a lower limit value of a predetermined rotation speed.

6. The machine tool according to claim 1, wherein
   the display unit indicates the relation between the variation width and the reference rotation speed, or the rotation speed candidate value where the varied maximum speed or the rotation speed candidate value is equal to or less than the upper limit rotation speed.

7. The machine tool according to claim 1, wherein
   the display unit indicates the variation width and the reference rotation speed, or the rotation speed candidate value where the condition that the varied maximum speed or the rotation speed candidate value is equal to the upper limit rotation speed is satisfied.

8. The machine tool according to claim 1, further comprising:
   a vibration detector that detects the chatter vibration, wherein
   the rotation speed control unit performs at least one of a variation for decreasing the reference rotation speed set value and a variation for approaching the variation width set value to the recommended variation width, or performs a variation of the rotation speed candidate value, or the rotation speed control unit indicates that varying should be made when a vibration detected by the vibration detector is equal to or more than a preliminarily stored threshold.

9. The machine tool according to claim 8, wherein
   the rotation speed control unit varies the variation width and the reference rotation speed in a state where the varied maximum speed is equal to the upper limit rotation speed.

* * * * *